(12) United States Patent
Tsukada et al.

(10) Patent No.: US 6,525,119 B2
(45) Date of Patent: Feb. 25, 2003

(54) CABLE SEMICONDUCTIVE SHIELD COMPOSITIONS

(75) Inventors: Kiroku Tsukada, Yokohama (JP); Ariyoshi Ohki, Yokohama (JP); Koji Ishihara, Tokyo (JP)

(73) Assignee: Nippon Unicar Company Limited, Tokyo (JP)

( * ) Notice: Subject to any disclaimer, the term of this patent is extended or adjusted under 35 U.S.C. 154(b) by 0 days.

(21) Appl. No.: 09/824,926

(22) Filed: Apr. 3, 2001

(65) Prior Publication Data

US 2001/0014709 A1 Aug. 16, 2001

(51) Int. Cl.[7] .................. C08K 5/54; C08K 5/541; C08K 5/5415
(52) U.S. Cl. .................. 524/263; 174/68.1; 174/102 C; 174/102 R; 174/102 SC; 174/110 R; 174/120 SC; 174/120 SR; 174/105 SC; 524/262; 524/268; 524/269; 524/265; 524/495; 524/496; 524/506; 525/700; 525/706
(58) Field of Search ................. 524/269, 506, 524/262, 263, 268, 495, 496, 265; 174/68.1, 102 C, 102 R, 102 SC, 105 SC, 110 R, 120 SC, 120 SR; 525/100, 106

(56) References Cited

U.S. PATENT DOCUMENTS

| | | | |
|---|---|---|---|
| 4,117,195 A | 9/1978 | Swarbrick et al. | 428/379 |
| 4,526,707 A | 7/1985 | Kutsuwa et al. | 252/511 |
| 5,218,027 A | * 6/1993 | Smith et al. | 524/265 |
| 5,543,189 A | * 8/1996 | Nakakura et al. | 428/36.8 |
| 6,153,691 A | * 11/2000 | Gornowicz et al. | 524/861 |

FOREIGN PATENT DOCUMENTS

| | | |
|---|---|---|
| JP | 212007 | 12/1983 |
| JP | 189110 | 9/1985 |
| JP | 58518 | 3/1987 |
| JP | 117202 | 5/1987 |
| JP | 89552 | 4/1988 |
| JP | 29210 | 2/1991 |
| JP | 247641 | 11/1991 |

* cited by examiner

Primary Examiner—Judy M. Reddick

(57) ABSTRACT

A composition comprising:
(a) one or more copolymers selected from the group consisting of (I) a copolymer of ethylene and vinyl acetate containing about 10 to about 50 percent by weight of units of vinyl acetate; (II) a copolymer of ethylene and ethyl acrylate containing about 10 to about 50 percent by weight of units of ethyl acrylate; and (III) a copolymer of ethylene and butyl acrylate containing about 10 to about 50 percent by weight of units of butyl acrylate;
(b) about 55 to about 200 parts by weight, based upon 100 parts by weight of component (a), of a linear copolymer of ethylene and an alpha-olefin having 3 to 12 carbon atoms, and a density of 0.870 to 0.944 grama per cubic centimeter;
(c) about 1 to about 50 parts by weight, based upon 100 parts by weight of component (a), of an organopolysiloxane;
(d) about 10 to about 350 parts by weight, based upon 100 parts by weight of component (a), of carbon black; and
(e) from 0 to about 2 parts by weight of an organic peroxide, the composition effective for being crosslinked, without a catalyst, with water to provide a cross linked composition.

15 Claims, No Drawings

CABLE SEMICONDUCTIVE SHIELD COMPOSITIONS

TECHNICAL FIELD

This invention relates to a power cable having a semiconductive shield and moisture cured insulation, particularly one having an adhesive internal semiconductive shield.

BACKGROUND INFORMATION

A typical electric power cable generally comprises one or more conductors in a cable core that is surrounded by several layers of polymeric materials including a first (internal) semiconductive shield layer (conductor or strand shield), an insulating layer, a second semiconductive shield layer (insulation shield or external semiconductive layer), a metallic tape or wire shield, and a protective jacket. The internal semiconductive shield is generally bonded. The external semiconductive shield can be either bonded to the insulation or strippable, with most applications using strippable shields. Additional layers within this construction such as moisture impervious materials are often incorporated.

Polymeric semiconductive shields have been utilized in multilayered power cable construction for many decades. Generally, they are used to fabricate solid dielectric power cables rated for voltages greater than 1 kilo Volt (kV). These shields are used to provide layers of intermediate conductivity between the high potential conductor and the primary insulation, and between the primary insulation and the ground or neutral potential. The volume resistivity of these semiconductive materials is typically in the range of $10^{-1}$ to $10^8$ ohm-centimeters when measured on a completed power cable construction using the methods described in ICEA S-66-524, section 6.12, or IEC 60502-2 (1997), Annex C. Typical internal or external shield compositions contain a polyolefin, such as ethylene/vinyl acetate copolymer with a high vinyl acetate content, conductive carbon black, an organic peroxide crosslinking agent, and other conventional additives such as a nitrile rubber, which functions as a strip force reduction aid, processing aids, and antioxidants. These compositions are usually prepared in granular or pellet form. Polyolefin formulations such as these are disclosed in U.S. Pat. No. 4,286,023 and European Patent Application 420 271. The shield composition is, typically, introduced into an extruder where it is co-extruded around an electrical conductor at a temperature lower than the decomposition temperature of the organic peroxide to form a cable. The cable is then exposed to higher temperatures at which the organic peroxide decomposes to provide free radicals, which crosslink the polymer. The electrical conductor can be, for example, made of annealed copper, semihard drawn copper, hard drawn copper, or aluminum.

Polyethylenes, which are typically used as the polymeric component in the insulation layer, can be made moisture curable by making the resin hydrolyzable, which is accomplished by adding hydrolyzable groups such as $-Si(OR)_3$ wherein R is a hydrocarbyl radical to the resin structure through conventional copolymerization or grafting techniques. Grafting can be effected at 210 to 250 degrees C. Suitable crosslinking agents are organic peroxides such as dicumyl peroxide; 2,5-dimethyl-2,5-di(t-butylperoxy) hexane; t-butyl cumyl peroxide; and 2,5-dimethyl-2,5-di(t-butylperoxy)hexyne-3. Dicumyl peroxide is preferred. The amount of organic peroxide used in the grafting process can be in the range of 0.01 to 4 parts by weight per 100 parts by weight of the base resin.

Suitable alkoxysilane compounds, which can be used to provide the hydrolyzable group can be represented by the following formula: $RR'SiY_2$ wherein R is an aliphatic unsaturated hydrocarbon group or a hydrocarbonoxy group, R' is a hydrogen atom or a saturated monovalent hydrocarbon group, and Y is an alkoxy group. Examples of R are vinyl, allyl, butenyl, cyclohexenyl, and cyclopentadienyl. The vinyl group is preferred. Examples of Y are ethoxy, methoxy, and butoxy.

Examples of ethylenically unsaturated alkoxysilanes are vinyl triethoxysilane, vinyl trimethoxysilane, and gamma-methacryloxypropyltrimethoxy-silane. The amount of alkoxysilane compound that can be used is preferably about 0.5 to about 20 parts by weight per 100 parts by weight of base resin.

Hydrolyzable groups can be added, for example, by copolymerizing ethylene with an ethylenically unsaturated compound having one or more $-Si(OR)_3$ groups or grafting these silane compounds to the resin in the presence of the aforementioned organic peroxides. The hydrolyzable resins are then crosslinked by moisture, e.g., steam or hot water, in the presence of a silanol condensation catalyst such as dibutyltin dilaurate, dioctyltin maleate, dibutyltin diacetate, stannous acetate, lead naphthenate, and zinc caprylate. Dibutyltin dilaurate is preferred. The amount of silanol condensation catalyst can be in the range of about 0.001 to about 20 parts by weight per 100 parts by weight of base resin, and is preferably about 0.005 to about 5 parts by weight.

Examples of hydrolyzable copolymers and hydrolyzable grafted copolymers are ethylene/vinyltrimethoxy silane copolymer, ethylene/gamma-methacryloxypropyltrimethoxy silane copolymer, vinyltrimethoxy silane grafted ethylene/ethyl acrylate copolymer, vinyltrimethoxy silane grafted linear low density ethylene/1-butene copolymer, and vinyltrimethoxy silane grafted low density polyethylene.

In applications where moisture cured insulation is used, it is desirable to provide a moisture cured semiconductive shield. The shield composition would then be prepared in the same manner as the moisture cured insulation as outlined above. Unfortunately, shield compositions, which could be moisture cured, were found to have a tendency to scorch, i.e., to prematurely crosslink during extrusion.

Further, the use of a conventional peroxide crosslinkable shield over a moisture curable insulation was not considered viable because of the incompatibility of the processing requirements for each. Typically, the peroxide system utilizes higher operating temperatures during the cure cycle, and these high temperatures interfere with the dimensional stability of the "uncured" moisture curable insulation. The upshot is that the peroxide system requires a pressurized curing tube, which is an integral part of the extrusion process, while the moisture curable insulation is cured in a post extrusion stage. Crosslinking via a peroxide does improve scorch, however.

It is apparent, then, that both the peroxide system and the moisture cure system for the insulation shield each have their drawbacks. Further, it is found especially desirable that the shield have the following characteristics:

(1) a volume specific resistance of 100 ohm-centimeters or less to prevent corona degradation caused by partial delamination and gap formation;

(2) an elongation of 100 percent or more to maintain elasticity, and prevent partial delamination and gap formation when the power cable is bent or is exposed in the heat cycle;

(3) a smooth interface between the moisture cured insulation layer and the internal shield with an absence of micro-protrusions;

(4) capable of being extruded high temperatures similar to the temperatures used for the moisture cured insulation layer, i.e., 210 to 250 degrees C.;

(5) a cold temperature resistance;

(6) a heat deformation at 120 degrees C. of 40 percent or less; and (7) good adhesion with the electrical conductor and the moisture cured insulation layer.

DISCLOSURE OF THE INVENTION

An object of this invention, therefore, is to provide a composition useful for an internal semiconductive shield, which has the above characteristics, particularly good adhesive qualities, and avoids the drawbacks of conventional peroxide and moisture cured shields. Other objects and advantages will become apparent hereinafter.

According to the invention, such an adhesive composition has been discovered. The composition comprises:

(a) one or more copolymers selected from the group consisting of (I) a copolymer of ethylene and vinyl acetate containing about 10 to about 50 percent by weight vinyl acetate and having a melt mass flow rate of about 1 to about 100 grams per 10 minutes; (II) a copolymer of ethylene and ethyl acrylate containing about 10 to about 50 percent by weight ethyl acrylate and having a melt mass flow rate of about 1 to about 100 grams per 10 minutes; and (III) a copolymer of ethylene and butyl acrylate containing about 10 to about 50 percent by weight butyl acrylate and having a melt mass flow rate of about 1 to about 100 grams per 10 minutes, and based upon 100 parts by weight of component (a):

(b) about 55 to about 200 parts by weight of a linear copolymer of ethylene and an alpha-olefin having 3 to 12 carbon atoms, the copolymer having a melt mass flow rate of about 0.1 to about 30 grams per 10 minutes and a density of 0.870 to 0.944 gram per cubic centimeter;

(c) about 1 to about 50 parts by weight of an organopolysiloxane having the following formula: $R^1_x R^2_y SiO_{(4-a-b)/2}$
wherein $R^1$ is an aliphatic unsaturated hydrocarbon group; $R^2$ is an unsubstituted or substituted monovalent hydrocarbon group excluding aliphatic unsaturated hydrocarbon groups; x is equal to or greater than 0 but less than 1; y is greater than 0.5 but less than 3; x+y is greater than 1 but less than 3; a is greater than 0 but equal to or less than 1; and b is equal to or greater than 0.5 but equal to or less than 3;

(d) about 10 to about 350 parts by weight of carbon black; and (e) optionally, up to about 2 parts by weight of an organic peroxide.

DESCRIPTION OF THE PREFERRED EMBODIMENT(S)

The resins most commonly used in semiconductive shields are elastomers of varying degrees of crystallinity from amorphous through low and medium crystallinity. These elastomers are typically ethylene/unsaturated ester copolymers, which are usually made by conventional high pressure free radical processes generally run at pressures above 15,000 psi (pounds per square inch). The ethylene/unsaturated ester copolymers used in this invention are set forth in component (a), above, i.e., one or more copolymers selected from the group consisting of (I) a copolymer of ethylene and vinyl acetate containing about 10 to about 50 percent, preferably about 15 to about 40 percent, by weight vinyl acetate and having a melt mass flow rate of about 1 to about 100 grams per 10 minutes; (II) a copolymer of ethylene and ethyl acrylate containing about 10 to about 50 percent, preferably about 15 to about 40 percent, by weight ethyl acrylate and having a melt mass flow rate of about 1 to about 100 grams per 10 minutes; and (III) a copolymer of ethylene and butyl acrylate containing about 10 to about 50 percent, preferably about 15 to about 40 percent, by weight butyl acrylate and having a melt mass flow rate of about 1 to about 100 grams per 10 minutes. The percent by weight is based on the total weight of the copolymer. Melt mass flow rate is determined under JIS (Japanese Industrial Standard) K-6760. It is measured at 190° C. and 21.6 kilograms in grams per 10 minutes.

Component (b) is about 55 to about 200, preferably about 75 to about 150, parts by weight of a linear copolymer of ethylene and an alpha-olefin having 3 to 12 carbon atoms, the copolymer having a melt mass flow rate of about 0.1 to about 30 grams per 10 minutes and a density of 0.870 to 0.944 gram per cubic centimeter. The ethylene polymers useful in subject invention are preferably produced in the gas phase. They can also be produced in the liquid phase in solutions or slurries by conventional techniques. They are usually produced by low pressure processes, which are typically run at pressures below 1000 psi. Typical catalyst systems, which can be used to prepare these polymers are magnesium/titanium based catalyst systems, which can be exemplified by the catalyst system described in U.S. Pat. No. 4,302,565; vanadium based catalyst systems such as those described in U.S. Pat. Nos. 4,508,842 and 5,332,793; 5,342,907; and 5,410,003; a chromium based catalyst system such as that described in U.S. Pat. No. 4,101,445; a metallocene catalyst system such as that described in U.S. Pat. No. 4,937,299 and 5,317,036; or other transition metal catalyst systems. Many of these catalyst systems are often referred to as Ziegler-Natta catalyst systems. Catalyst systems, which use chromium or molybdenum oxides on silica-alumina supports, are also useful. Typical processes for preparing the polymers are also described in the aforementioned patents. Blends of these copolymers can be used if desired. Typical in situ polymer blends and processes and catalyst systems for providing same are described in U.S. Pat. Nos. 5,371,145 and 5,405,901. The linear copolymers can be, among others, LLDPE or VLDPE.

The linear low density polyethylene (LLDPE) can have a density in the range of 0.916 to 0.925 gram per cubic centimeter. It can be a copolymer of ethylene and one or more alpha-olefins having 3 to 12 carbon atoms, and preferably 3 to 8 carbon atoms. The preferred alpha-olefins can be exemplified by propylene, 1-butene, 1 hexene, 4-methyl-1-pentene, and 1-octene, and the catalysts and processes can be the same as those mentioned above subject to variations necessary to obtain the desired densities and melt indices.

The very low density polyethylene (VLDPE) can also be a copolymer of ethylene and one or more alpha-olefins having 3 to 12 carbon atoms and preferably 3 to 8 carbon atoms. Preferred alphaolefins are mentioned above. The density of the VLDPE can be in the range of 0.870 to 0.915 gram per cubic centimeter. It can be produced using the catalysts and processes mentioned above. The portion of the VLDPE attributed to the comonomer(s), other than ethylene, can be in the range of about 1 to about 49 percent by weight based on the weight of the copolymer and is preferably in the range of about 15 to about 40 percent by weight. A third comonomer can be included, e.g., another alpha-olefin or a diene such as ethylidene norbornene, butadiene, 1,4-hexadiene, or a dicyclopentadiene. The third comonomer can be present in an amount of about 1 to 15 percent by weight based on the weight of the copolymer and is preferably present in an amount of about 1 to about 10 percent by weight. It is preferred that the copolymer contain two or three comonomers inclusive of ethylene.

Component (c) is about 1 to about 50, preferably about 2 to about 10, parts by weight of an organopolysiloxane having the following formula: $R^1_x R^2_y SiO_{(4-a-b)/2}$ wherein $R^1$ is an aliphatic unsaturated hydrocarbon group; $R^2$ is an unsubstituted or substituted monovalent hydrocarbon group excluding aliphatic unsaturated hydrocarbon groups; x is equal to or greater than 0 but less than 1; y is greater than 0.5 but less than 3; x+y is greater than 1 but less than 3; a is greater than 0 but equal to or less than 1; and b is equal to or greater than 0.5 but equal to or less than 3.

In the organopolysiloxane expressed by the aforementioned formula, $R^1$ can be, for example, a vinyl, allyl, acryl, or methacryl group, and $R^2$ can be an alkyl group such as methyl, ethyl, or propyl; an aryl group such as phenyl or tolyl; a cycloalkyl group such as cyclohexyl or cyclobutyl. The $R^2$ groups can be substituted with various substituents such as halogen atoms, or cyano or mercapto.

Organopolysiloxanes, which can be used in the present invention, can be exemplified by linear, branched, cyclic, network, or stereo network structures provided that the molecular structure is within the formula, but the linear structure is preferable. The degree of polymerization of the organopolysiloxane is not particularly limited, but it preferably has a degree of polymerization which does not inhibit kneading with the ethylene copolymer.

One organopolysiloxane, which can be used is silicone gum. Another linear organopolysiloxane can be represented by the following formula: $R_3$-Si-O-($R_2$-Si-O)n-$R_3$ wherein R is a substituted or unsubstituted monovalent hydrocarbon and n is at least 10. This compound is generally referred to as a silicone oil. R can be an alkyl or aryl group and hydrogen. Examples of the alkyl group are methyl, ethyl, n-propyl, isopropyl, n-butyl, isobutyl, and t-butyl. An example of the aryl group is phenyl. The Rs can be the same or different except that the Rs cannot all be hydrogen, and part of the R can be, for example, vinyl or hydroxyl; n can be 10 to 10,000 and is preferably 100 to 1000. It is desirable that the viscosity of the organopolysiloxane in liquid form is a least about 10 centistokes, and is preferably about 1000 to about 1,000,000 centistokes, at 23 degrees C.

Component (d): In order to provide a semiconductive shield it is necessary to incorporate conductive particles into the composition. These conductive particles are generally provided by particulate carbon black, which is referred to above. Useful carbon blacks can have a surface area of about 50 to about 1000 square meters per gram. The surface area is determined under ASTM D 4820-93a (Multipoint B.E.T. Nitrogen Adsorption). The carbon black can be used in the semiconductive shield composition in an amount of about 10 to about 350 parts by weight, and preferably about 40 to about 300 parts by weight. An objective is to keep the volume specific resistance at less than about 100 ohm-centimeters. Both standard conductivity and high conductivity carbon blacks can be used with standard conductivity blacks being preferred. Examples of conductive carbon blacks are the grades described by ASTM N550, N472, N351, N110, acetylene black, furnace black, and Ketjen black. The Ketjen black is particularly desirable as one third to one half the amount of Ketjen black provides the same level of conductivity as the full amount of a conventional carbon black.

Optionally, the following copolymer can be included in semiconductive shield compositions: a copolymer of acrylonitrile and butadiene wherein the acrylonitrile is present in an amount of about 30 to about 60 percent by weight based on the weight of the copolymer, and is preferably present in an amount of about 40 to about 50 percent by weight. This copolymer is also known as a nitrile rubber or an acrylonitrile/butadiene copolymer rubber. The density can be, for example, 0.98 gram per cubic centimeter and the Mooney Viscosity can be (ML 1+4) 50. A silicone rubber can be substituted for this copolymer (e) Organic peroxide component. As noted, this component is optional, but it is preferred that it be in the insulation shield composition. The organic peroxide has an (O—O) bond in the molecule, and it is preferable that it has a 10 minute half life at 100 to 220 degrees C. It assists the filling and dispersing properties of the carbon black by grafting components (a) through (d), and not initiating a crosslinking reaction with respect to these components. Examples of suitable organic peroxides follow (the figure in parenthesis is the decomposition temperature of the organic peroxide in degrees C): succinic acid peroxide (110), benzoyl peroxide (110), t-butylperoxy-2-ethylhexanoate (113), p-chlorobenzoyl peroxide (115), t-butylperoxyisobutyrate (115), t-butylperoxyisopropylcarbonate (135), t-butylperoxylaurate (140), 2,5-dimethyl-2,5-di (benzoylperoxy)hexane (140), t-butylperoxyacetate (140), di-t-butyldiperoxyphthalate (140), t-butylperoxybenzoate (145), dicumyl peroxide (150), 2,5-dimethyl-2,5-di(t-butylperoxy)hexane (155), t-butylcumyl peroxide (155), t-butylhydroperoxide (158), di-t-butyl peroxide (160), 2,5-dimethyl-2,5-di(t-butylperoxy)hexyne-3 (170), di-isopropylbenzenehydroperoxide (170), p-menthanehydroperoxide (180), 2,5-dimethylhexane-2,5-dihydroperoxide (213), and cumenehydroperoxide (149). Among these, cumyl peroxide, 2,5-dimethyl-2,5-(t-butylperoxy)hexane, and cumenehydroperoxide are preferred.

The blending amount of the organic peroxide is up to about 2 parts by weight, and is preferably in the range of about 0.15 to about 0.8 part by weight, and more preferably in the range of about 0.3 to about 0.6 part by weight. Its function is to initiate a graft reaction between components (a) through (d), particularly components (a) and (d).

The insulation shield composition can be prepared in the following ways:

(i) Component (c) can be grafted to component (a) by kneading while heating at about 220 degrees C. Then all of the components can be fed into an extruder.

(ii) Component (c) can be grafted to component (a) by heating at about 160 degrees C. in the presence of an organic peroxide. Then all of the components can be fed into an extruder.

(iii) The polymers can be grafted to one another by kneading components (a), (b), and (c) together while heating at about 165 degrees C. in the presence of an organic peroxide. Then, all of the components can be fed into an extruder.

Conventional additives, which can be introduced into the composition, are exemplified by antioxidants, coupling agents, ultraviolet absorbers or stabilizers, antistatic agents, pigments, dyes, nucleating agents, reinforcing fillers or polymer additives, slip agents, plasticizers, processing aids, lubricants, viscosity control agents, tackifiers, anti-blocking agents, surfactants, extender oils, metal deactivators, voltage stabilizers, flame retardant fillers and additives, crosslinking agents, boosters, and catalysts, and smoke suppressants. Additives and fillers can be added in amounts ranging from less than about 0.1 to more than about 50 percent by weight based on the weight of the composition.

Examples of antioxidants are: hindered phenols such as tetrakis [methylene(3,5-di-tert-butyl-4-hydroxyhydrocinnamate)]methane, bis[(beta-(3,5-di-tert-butyl-4-hydroxybenzyl)-methylcarboxyethyl)]sulphide, 4,4'-thiobis (2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy) hydrocinnamate; phosphites and phosphonites such as tris (2,4-di-tert-butylphenyl)phosphite and di-tert-butylphenyl-phosphonite; thio compounds such as dilaurylthiodipropionate, dimyristylthiodipropionate, and distearylthiodipropionate; various sloxanes; and various amines such as polymerized 2,2,4-trimethyl-1,2-dihydroquinoline, 4,4'-bis(alpha,alpha-demthylbenzyl) diphenylamine, and alkylated diphenylamines. Antioxidants can be used in amounts of about 0.001 to about 5 percent by weight based on the weight of the composition.

Compounding can be effected in a conventional melt/mixer or in a conventional extruder, and these terms are used in this specification interchangeably. Generally, the conductive shield composition is prepared in a melt/mixer and then pelletized using a pelletizer attachment or an extruder adapted for pelletizing. Both the melt/mixer, as the name implies, and the extruder, in effect, have melting and mixing zones although the various sections of each are known to those skilled in the art by different names. The semiconductive shield composition of the invention can be prepared in various types of melt/mixers and extruders such as a Brabender™ mixer, Banbury™ mixer, a roll mill, a BUSS™ co-kneader, a biaxial screw kneading extruder, and single or twin screw extruders. A description of a conventional extruder can be found in U.S. Pat. No. 4,857,600. In addition to melt/mixing, the extruder can coat a wire or a core of wires. An example of co-extrusion and an extruder therefor can be found in U.S. Pat. No. 5,575,965. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating, where the material is crosslinked after extrusion, the die of the crosshead feeds directly into a heating zone, and this zone can be maintained at a temperature in the range of about 130° C. to about 260° C., and preferably in the range of about 170° C. to about 220° C. Double layer simultaneous extruding machines and triple layer simultaneous extruding machines are advantageously used to prepare the power cable with the various layers described above.

The advantages of the invention are excellent semiconductivity, elongation, adhesiveness, processability, surface smoothness, cold temperature resistance, and heat endurance The term "surrounded" as it applies to a substrate being surrounded by an insulating composition, jacketing material, or other cable layer is considered to include extruding around the substrate; coating the substrate; or wrapping around the substrate as is well known by those skilled in the art. The substrate can include, for example, a core including a conductor or a bundle of conductors, or various underlying cable layers as noted above.

All molecular weights mentioned in this specification are weight average molecular weights unless otherwise designated.

The patents mentioned in this specification are incorporated by reference herein.

The invention is illustrated by the following examples

EXAMPLES

The experimental methods in the examples are as follows.
(1) Interface Smoothness:
The interface between the moisture crosslinked polyethylene insulation layer and the internal semi-conductive layer is evaluated visually.
(2) Heat Deformation Rate of the Internal Semiconductive Layer:
The heat endurance of the internal semiconductive layer at 120 degrees C. is determined by following test in accordance with JIS C3005: Heat deformation test method.
(i) Preparation of Test Piece
The semiconductive resin composition for the internal semiconductive layer is kneaded by heating at 220 degrees C., a plate shaped piece 2 millimeters thick, 15 millimeters wide, and 30 millimeters long is molded by a hot press molder, and it is used as the test piece.
(ii) Determination Method
The test piece is placed on a semicircular part of a semicircular bar of 5 millimeters in diameter; a parallel plate is stacked on the test piece; it is heated in an oven at 120 degrees C. for 30 minutes, then 2 kilograms of pressure is loaded onto the parallel plate, allowed to stand for 30 minutes, and the thickness of the test piece is measured. A thickness decrease rate is then determined.
(3) Adhesiveness Test of the Internal Semi-conductive Layer: It is Performed by Following Method.
(i) Preparation of Test Piece
The moisture crosslinking polyethylene resin composition is kneaded by heating at 220 degrees C. and a sheet 1.5 millimeters thick, 150 millimeters long and 180 millimeters wide is prepared with a hot press molder. On the other hand, the semiconductive resin composition for the internal semi-conductive layer is kneaded by heating at 200 degrees C., and a sheet 2 millimeters thick, 150 millimeters long and 180 millimeters wide is prepared with a hot press molder. Both sheets are unified at a temperature of 180 degrees C. and a pressure of 15 MPa to make a 3 millimeter thick sheet, and it is moisture crosslinked in steam at 80 degrees C. for 24 hours. A test piece 12.5 millimeters in width and 120 millimeters long is stamped out from the double layer sheet.
(ii) Test Method
A peeling test with a pulling rate of 500 millimeters per minute at 23 degrees C. is performed by using a tensile machine, and a force to peel the internal semiconductive layer from the moisture crosslinked polyethylene layer at an angle of 180 degrees is determined as a peel strength in kilograms per 0.5 inch.

(4) Tensile Strength of the Internal Semiconductive Layer

The semiconductive resin composition for the internal semiconductive layer is kneaded by heating at 200 degrees C. and a sheet 2 millimeters thick, 150 millimeters long and 180 millimeters wide is prepared with a hot press molder, it is tested as a test piece, and a tensile strength is determined under JIS K-6760.

(5) Elongation of the Internal Semi-conductive Layer

Elongation is determined under JIS K-6760 by using a test piece prepared in the same manner as for tensile strength.

(6) Gel Fraction of the Moisture Crosslinked Polyethylene Insulation Layer

A sample is taken from the moisture crosslinked polyethylene insulation layer; it is immersed in xylene at 110 degrees C. for 24 hours, and the extraction residue is determined as the gel fraction.

(7) Extrusion Processability

Melt mass flow rate of the semi-conductive resin composition for internal semiconductive layer is evaluated by determining the melt mass flow rate under conditions of 190 degrees C. and a 21.6 kilogram load by using a melt indexer (JIS K-6760).

(8) Volume Specific Resistance

The volume specific resistance of the semiconductive resin composition for the internal semiconductive layer is determined under JIS K-6723.

Example 1

(A) Preparation of the resin composition for the internal semiconductive layer: 0.3 part by weight of tetrakis [methylene-3-(3,5-di-t-butyl-4-hydroxyphenyl)propionate] methane and 30 parts by weight of Ketjen black are blended with 100 parts by weight of a high pressure process ethylene/vinyl acetate copolymer containing 28 percent by weight vinyl acetate, and having a melt mass flow rate of 20 grams per 10 minutes and a density of 0.938 gram per cubic centimeter; 70 parts by weight of a linear copolymer of ethylene and butene-1 having a melt mass flow rate of 0.8 gram per 10 minutes and a density of 0.922 gram per cubic centimeter, prepared in the gas phase by a low pressure process; and 5 parts by weight of silicone gum containing 1 percent by weight of methylvinylsilicone and having a viscosity of 300,000 centistokes at 23 degrees C. The five components are kneaded at 220 degrees C. for 10 minutes, and cylindrically pelletized to pellets, each 3 millimeters in diameter and 3 millimeters in height. Then, 0.3 part by weight of 2,5-dimethyl-2,5-di(t-butylperoxy)hexyne, an organic peroxide, is added to the pellets; the organic peroxide is evenly impregnated into in the pellets by slow mixing at 70 degrees C. for 5 hours, and the resin composition for the internal semiconductive layer is prepared.

(B) Preparation of the resin composition for the moisture crosslinking polyethylene insulation layer. Monomer fluid comprised of 90 parts by weight of ethylene and 10 parts by weight of 1-butene is fluidized from the bottom side of a fluidized bed toward the upside and it is polymerized at 90 degrees C., 2.5 MPa of pressure, and Gmf5 in a gas phase fluidized bed in the presence of a polymerization catalyst impregnated with chromium trioxide, tetraisopropyl titanate, and $(NH_4)_2SiF_6$ in a porous silica support having a surface area of 300 square meters per gram, 70 microns of mean diameter, and 100 microns of pore diameter. A granular product having a surface area of 1000 square centimeters per gram, a bulk density of 0.4 gram per cubic centimeter, and a mean particle size of 0.8 millimeter is obtained. It is comprised of ethylene/butene-1 copolymer having a density of 0.920 gram per cubic centimeter and a melt mass flow rate of 0.8 gram per 10 minutes.

100 parts by weight of the aforementioned granular linear low density ethylene/butene-1 copolymer is preheated at a temperature of 60 degrees C., and 2 parts by weight of vinyltrimethoxysilane and 0.1 part by weight of dicumyl peroxide are preheated at a temperature of 50 degrees C. All are transferred into a ribbon mixer. They are mixed for 30 minutes with heating at a temperature of 60 degrees C. Then the mixture is allowed to stand for 2 hours while maintaining the temperature at 60 degrees C., and a linear low density ethylene-butene-1 copolymer impregnated with an unsaturated alkoxysilane and organic peroxide is obtained.

Separately, 1 part by weight of dibutyltin dilaurate and 2 parts by weight of tetrakis [methylene-3-(3,5-di-t-butyl-4-hydroxyphenyl)propionate]methane are mixed with 100 parts by weight of high pressure low density polyethylene having a density of 0.920 gram per cubic centimeter and a melt mass flow rate of 0.8 gram per 10 minutes. They are kneaded at a temperature of 150 degrees C. for 10 minutes with a Banbury™ mixer and polyethylene blended with silanol condensation catalyst and antioxidant is obtained after pelletizing.

95 percent by weight of the aforementioned linear low density ethylene/alpha-olefin copolymer impregnated with the unsaturated alkoxysilane and organic peroxide is added to 5 percent by weight of the aforementioned polyethylene blended with the silanol condensation catalyst and antioxidant. They are mixed, and the resin composition for moisture cross-linking insulation layer is prepared.

(C) The strippable semiconductive resin composition for external semiconductive layer is prepared as follows:

(a) 100 parts by weight of ethylene/vinyl acetate copolymer containing 28 percent by weight vinyl acetate and having a melt mass flow rate of 20 grams per 10 minutes and a density of 0.938 gram per cubic centimeter;

(b) 70 parts by weight of linear ethylene/butene-1 copolymer having a melt mass flow rate of 0.8 gram per 10 minutes and a density of 0.922 gram per cubic produced by a gas phase and low pressure process;

(c) 20 parts by weight of polypropylene having a melt mass flow rate of 0.9 gram per 10 minutes and a density of 0.900 gram per cubic centimeter;

(d) 5 parts by weight of silicone gum stock containing 1 percent by weight methylvinylsilicone having a viscosity of 300,000 centistokes at 23 degrees C.

(e) 30 parts by weight of Ketjen black;

(f) 0.3 part by weight of 2,5-dimethyl-2,5-di(t-butylperoxy)hexyne; and (g) 0.3 part by weight of tetrakis[methylene-3-(3,5-di-t-butyl4-hydroxyphenyl)propionate]methane.

(D) Preparation of common triple layer extruding machine

Three extruder mounting screen packs of 150 mesh, 250 mesh and 120 mesh, respectively, at the die plates are combined to make an extruding machine having common triple layer cross heads sequentially positioned as the internal semiconductive layer extruder, insulation layer extruder, and external semiconductive layer extruder.

(E) Production of moisture crosslinked polyethylene insulation power cable

The components of the resin composition for internal semiconductive layer, moisture crosslinking polyethylene resin composition, and strippable semiconductive resin composition for external semiconductive layer prepared as above are supplied to the internal semiconductive layer extruder, moisture crosslinking polyethylene layer extruder and external semiconductive layer extruder of the triple layer common extruding machine, respectively.

The components are kneaded by heating at 200 degrees C. at the internal semiconductive layer extruder, 220 degrees C. at the moisture crosslinking polyethylene layer extruder and 220 degrees C. at the external semiconductive layer extruder, and they are simultaneously extruded on a conductive body of hard drawn copper strand to make a 1 millimeter thick internal semiconductive layer, a 4 millimeter thick moisture crosslinking polyethylene insulation layer and a 1 millimeter external semiconductive layer. This procedure results in the formation of a cable.

Then the extruded cable is exposed to steam at 80 degrees C. for 24 hours to complete the moisture crosslinking reaction. After drying, the cable is covered with a polyvinyl chloride compound to make a 3 millimeter thick jacket layer, and the moisture crosslinked polyethylene insulation power cable is produced.

The performance evaluation results of the moisture crosslinked polyethylene insulation power cable is shown hereinafter.

(1) Interface smoothness: The interface between the moisture crosslinked polyethylene insulation layer and the internal semiconductive layer is smooth, and it is not recognized as protruding over a 300 micron diameter.

(2) Heat deformation ratio of the internal semiconductive layer: The thickness decrease rate is 1.1 percent and the heat endurance is sufficient.

(3) Peeling test of the internal semiconductive layer: The peel strength is 5.5 kilograms per 0.5 inch and the adhesiveness is sufficient.

(4) Tensile strength of the external semiconductive layer: The, tensile strength is 14.7 MPa, and it is shown that the mechanical strength is sufficient.

(5) Elongation of the internal semi-conductive layer: The elongation is 481 percent.

(6) Gel fraction of the moisture crosslinked polyethylene insulation layer: The gel fraction is 62 percent indicating it is sufficiently moisture crosslinked and its heat endurance is sufficient.

(7) Extrusion processability: Melt mass flow rate is 43 grams per 10 minutes and the extrusion processability is sufficient.

(8) Volume specific resistance: The volume specific resistance is 28 ohm-centimeters, and it is in an appropriate level.

Example 2

(A) Preparation of the resin composition for the internal semiconductive layer: 0.3 part by weight of tetrakis [methylene-3-(3,5-di-t-butyl-4-hydroxyphenyl)propionate] methane and 130 parts by weight of furnace black are blended with 100 parts by weight of a high pressure process ethylene/ethyl acrylate copolymer containing 32 percent by weight ethyl aciylate, and having a melt mass flow rate of 10 grams per 10 minutes and a density of 0.941 gram per cubic centimeter; 150 parts by weight of a linear copolymer of ethylene and hexene-1 having a melt mass flow rate of 1.8 grams per 10 minutes; and a density of 0.935 gram per 10 minutes produced by a solution process using a single site metallocene catalyst; and 45 parts by weight of silicone gum containing 0.7 percent by weight methylvinylsilicone and having a viscosity of 150,000 centistokes at 23 degrees C. The components are kneaded at 220 degrees C. for 10 minutes, and cylindrically pelletized to pellets, each 3 millimeters in diameter and 3 millimeters in height. Then, 1.8 parts by weight of 2,5-dimethyl-2,5-di(t-butylperoxy) hexyne, an organic peroxide, is added to the pellets; the organic peroxide is evenly impregnated into in the pellets by slow mixing at 70 degrees C. for 5 hours, and the resin composition for the internal semiconductive layer is prepared.

(B) Preparation of the resin composition for the moisture crosslinking polyethylene insulation layer.

0.1 part by weight of dicumyl peroxide and 2 parts by weight of vinyltrimethoxysilane are added to 100 parts by weight of a high pressure process low density polyethylene having a melt mass flow rate of 2 grams per 10 minutes and a density of 0.922 gram per cubic centimeter, and a silane modified polyethylene is produced by extruding these components from the extruder at 230 degrees C.

Separately, a catalyst masterbatch is made by mixing 1 part by weight of dibutyltin dilaurate and 5 parts by weight of tetrakis [methylene-3-(3,5-di-t-butyl-4-hydroxyphenyl) propionate]methane with 100 parts by weight of high pressure low density polyethylene having a density of 0.917 gram per cubic centimeter and a melt mass flow rate of 3 grams per 10 minutes. The silane modified polyethylene is then mixed with the master batch in a weight ratio of 100 to 5. The resin composition for the moisture crosslinkable insulation layer is prepared.

(C) The strippable semiconductive resin composition for external semiconductive layer is prepared as follows:
(a) 100 parts by weight of ethylene/ethylene acetate copolymer containing 32 percent by weight ethyl acrylate and having a melt mass flow rate of 10 grams per 10 minutes and a density of 0.941 gram per cubic centimeter;
(b) 150 parts by weight of linear ethylene/hexene-1 copolymer having a melt mass flow rate of 1.8 gram per 10 minutes and a density of 0.935 gram per cubic produced by a solution process using a single site metallocene catalyst;
(c) 40 parts by weight of propylene/ethylene copolymer containing 5 percent by weight ethylene and having a melt mass flow rate of 2.5 grams per 10 minutes and a density of 0.900 gram per cubic centimeter;
(d) 45 parts by weight of silicone gum stock containing 0.7 percent by weight methylvinylsilicone having a viscosity of 150,000 centistokes at 23 degrees C.
(e) 130 parts by weight of furnace black;
(f) 1.8 parts by weight of 2,5-dimethyl-2,5-di(t-butylperoxy)hexyne; and
(g) 0.3 part by weight of tetrakis[methylene-3-(3,5-di-t-butyl-4-hydroxyphenyl)propionate]methane.

(D) Preparation of common triple layer extruding machine and (E) Production of moisture crosslinked polyethylene insulation power cable of example 1 are repeated. The result is a jacketed cable similar to that of example 1 except for the variations in composition noted above.

The performance evaluation results of the moisture crosslinked polyethylene insulation power cable are shown hereinafter.

(1) Interface smoothness: The interface between the moisture crosslinked polyethylene insulation layer and the internal semiconductive layer is smooth, and it is not recognized as protruding over a 300 micron diameter.

(2) Heat deformation ratio of the internal semiconductive layer: The thickness decrease rate is 1.3 percent and the heat endurance is sufficient.

(3) Peeling test of the internal semiconductive layer: The peel strength is 4.8 kilograms per 0.5 inch and the adhesiveness is sufficient.

(4) Tensile strength of the internal semiconductive layer: The tensile strength is 13.2 MPa, and the mechanical strength is sufficient.

(5) Elongation of the internal semi-conductive layer: The elongation is 395 percent.

(6) Gel fraction of the moisture crosslinked polyethylene insulation layer: The gel fraction is 59 percent indicating it is sufficiently moisture crosslinked and its heat endurance is sufficient.

(7) Extrusion processability: Melt mass flow rate is 38 grams per 10 minutes and the extrusion processability is sufficient.

(8) Volume specific resistance: The volume specific resistance is 32 ohm-centimeters, and it is at an appropriate level.

Example 3

Example 1 is repeated except that the semi-conductive resin composition for the internal semiconductive layer is as follows:

(a) 100 parts by weight of ethylene/butyl acrylate copolymer containing 17 percent by weight butyl acrylate and having a melt mass flow rate of 5 grams per 10 minutes and a density of 0.937 gram per cubic centimeter.

(b) 100 parts by weight of linear ethylene/hexene-1 copolymer having a melt mass flow rate of 20 grams per 10 minutes and a density of 0.900 gram per cubic centimeter produced in the gas phase by a low pressure process.

(c) 30 parts by weight of dimethylpolysiloxane oil containing 0.8 percent by weight methylvinylsilicone having a viscosity of 3,000 centistokes at 23 degrees C.

(d) 20 parts by weight of Ketjen black.

(e) 1.8 part by weight of 2,5-dimethyl-2,5-di(t-butylperoxy)hexyne.

(g) 0.3 part by weight of tetrakis[methylene-3-(3,5-di-t-butyl4-hydroxyphenyl)propionate]methane.

The results are as follows (1) Interface smoothness: The interface between the moisture crosslinked polyethylene insulation layer and the internal semi-conductive layer is smooth, and it is not recognized as protruding over 300 microns in diameter.

(2) Heat deformation ratio of the internal semiconductive layer: The thickness decrease rate is 1.1 percent and the heat endurance is sufficient.

(3) Peeling test of the internal semiconductive layer: The peel strength is 5.2 kilograms per 0.5 inch and the adhesiveness is sufficient.

(4) Tensile strength of the internal semiconductive layer: The tensile strength is 11.2 MPa, and the mechanical strength is sufficient.

(5) Elongation of the internal semiconductive layer: The elongation is 435 percent.

(6) Gel fraction of the moisture crosslinked polyethylene insulation layer: The gel fraction is 62 percent. It is found to be sufficiently moisture crosslinked and its heat endurance is sufficient.

(7) Extrusion processability: The melt mass flow rate is 58 grams per 10 minutes and the extrusion processability is sufficient.

(8) Volume specific resistance: The volume specific resistance is 47 ohm-centimeters and it is at an appropriate level.

Comparative Example 1

Example 1 is repeated except that the ethylene/vinyl acetate copolymer is replaced with an ethylene/vinyl acetate copolymer containing 8 percent by weight vinyl acetate. It is found that the flexibility and adhesiveness of the internal semiconductive layer has deteriorated.

Comparative Example 2

Example 1 is repeated except that the ethylene/vinyl acetate copolymer is replaced with an ethylene/vinyl acetate copolymer containing 55 percent by weight vinyl acetate. It is found that the tensile strength of the internal semiconductive layer drops, and the mechanical strength of the internal semiconductive layer becomes insufficient.

Comparative Example 3

Example 1 is repeated except that the ethylene/vinyl acetate copolymer is replaced with an ethylene/vinyl acetate copolymer having a melt mass flow rate of 0.8 gram per 10 minutes. It is found that the extrusion processability, flexibility, and elongation become insufficient.

Comparative Example 4

Example 1 is repeated except that the ethylene/vinyl acetate copolymer is replaced with an ethylene/vinyl acetate copolymer having a melt mass flow rate of 120 grams per 10 minutes. It is found that the tensile strength and heat endurance of the internal semiconductive layer become insufficient.

Comparative Example 5

Example 1 is repeated except that the ethylene/butene-1 copolymer is replaced with an ethylene/butene-1 copolymer having a melt mass flow rate of 0.08 gram per 10 minutes. It is found that the processability of the internal semiconductive layer has deteriorated.

Comparative Example 6

Example 1 is repeated except that the ethylene/butene-1 copolymer is replaced with an ethylene/butene-1 copolymer having a melt mass flow rate of 35 grams per 10 minutes. It is found that the tensile strength of the internal semiconductive layer has weakened.

Comparative Example 7

Example 1 is repeated except that the ethylene/butene-1 copolymer is replaced with an ethylene/butene-1 copolymer having a density of 0.850 gram per cubic centimeter. It is found that the heat of deformation ratio at and above 120 degrees C. of the internal semiconductive layer has deteriorated.

Comparative Example 8

Example 1 is repeated except that the ethyleneibutene-1 copolymer is replaced with an ethylene/butene-1 copolymer having a density of 0.948 gram per cubic centimeter. It is found that the flexibility of the internal semiconductive layer has deteriorated.

Comparative Example 9

Example 1 is repeated except that the amount of ethyleneibutene-1 copolymer is changed to 50 parts by weight. It is found that the heat deformation ratio at and above 120 degrees C. of the internal semiconductive layer has deteriorated.

Comparative Example 10

Example 1 is repeated except that the amount of ethylene/butene-1 copolymer is changed to 220 parts by weight. It is found that the flexibility, elongation, and carbon black filling properties of the internal semiconductive layer have deteriorated.

Comparative Example 11

Example 1 is repeated except that the amount of silicone gum stock is changed to 0.3 part by weight. It is found that the interface smoothness becomes insufficient.

Comparative Example 12

Example 1 is repeated except that the amount of silicone gum stock is changed to 55 parts by weight. It is found that the processability and interface smoothness have deteriorated, and the tensile strength becomes insufficient.

Comparative Example 13

Example 1 is repeated except that the amount of Ketjen black is changed to 5 parts by weight. It is found that the volume specific resistance of the internal semiconductive layer is 220 ohm-centimeters.

Comparative Example 14

Example 1 is repeated except that the amount of Ketjen black is changed to 380 parts by weight. It is found that the tensile strength, processability, flexibility, and elongation of the internal semiconductive layer become insufficient.

Comparative Example 15

Example 1 is repeated except that the amount of organic peroxide is changed to 2.3 parts by weight. It is found that many protrusions are produced on the surface of the internal semiconductive layer and a smooth surface is not obtained.

What is claimed is:

1. A composition comprising:
    (a) one or more copolymers selected from the group consisting of (I) a copolymer of ethylene and of vinyl acetate containing about 10 to about 50 percent by weight of units of vinyl acetate and having a melt mass flow rate of about 1 to about 100 grams per 10 minutes; (II) a copolymer of ethylene and ethyl acrylate containing about 10 to about 50 percent by weight of units of ethyl acrylate and having a melt mass flow rate of about 1 to about 100 grams per 10 minutes; and (III) a copolymer of ethylene and butyl acrylate containing about 10 to about 50 percent by weight of units of butyl acrylate and having a melt mass flow rate of about 1 to about 100 grams per 10 minutes;
    (b) about 55 to about 200 parts by weight, based upon 100 parts by weight of component (a), of a linear copolymer of ethylene and an alpha-olefin having 3 to 12 carbon atoms, the linear copolymer of ethylene having a melt mass flow rate of about 0.1 to about 30 grams per 10 minutes and a density of 0.870 to 0.944 gram per cubic centimeter;
    (c) about 1 to about 50 parts by weight, based upon 100 parts by weight of component (a), of an organopolysiloxane having the following formula: $R^1_x R^2_y SiO_{(4-a-b)/2}$
    wherein $R^1$ is an aliphatic unsaturated hydrocarbon group; $R^2$ is selected from the group consisting of alkyl, substituted alkyl, aryl, substituted aryl, hydrogen and mixtures thereof, wherein the substituents of the substituted alkyl and substituted aryl are selected from the group consisting of halogen, cyano and mercapto; x is equal to or greater than 0 but less than 1; y is greater than 0.5 but less than 3; x+y is greater than 1 but less than 3; a is greater than 0 but equal to or less than 1; and b is equal to or greater than 0.5 but equal to or less than 3;
    (d) about 10 to about 350 parts by weight, based upon 100 parts by weight of component (a), of carbon black; and
    (e) from 0 to about 2 parts by weight of an organic peroxide, the composition effective for being cross-linked, without a catalyst, with water to provide a cross-linked composition.

2. The composition defined in claim 1 wherein the vinyl acetate in component (a) is present in an amount of about 15 to about 40 percent by weight; the ethyl acrylate of component (a) is present in an amount of about 15 to about 40 percent by weight; and the butyl acrylate in component (a) is present in an amount of about 15 to about 40 percent by weight.

3. The composition defined in claim 1 wherein;
    the linear copolymer of ethylene and an alpha-olefin of component (b) is present in an amount of about 75 to about 150 parts by weight;
    the organopolysiloxane of component (c) is present in an amount of about 2 to about 10 parts by weight;
    the carbon black of component (d) is present in an amount of about 40 to about 300 parts by weight; and
    the peroxide of component (e) is present in an amount of about 0.15 to about 0.8 parts by weight.

4. The composition defined in claim 1 wherein component (b) is linear low density polyethylene or very low density polyethylene.

5. The composition defined in claim 1 wherein component (c) is a silicone gum or a silicone oil.

6. The composition defined in claim 1 wherein the organic peroxide has a 10 minute half life at 100 to 220 degrees C.

7. A cable comprising an electrical conductor or a core of electrical conductors surrounded by a moisture cured internal semiconductive layer, which is surrounded by, and contiguous with, a moisture cured insulation layer, said internal semiconductive layer comprising a moisture cured composition comprising the reaction product of:
    (a) one or more copolymers selected from the group consisting of (I) a copolymer of ethylene and vinyl acetate containing about 10 to about 50 percent by weight of units of vinyl acetate and having a melt mass flow rate of about 1 to about 100 grams per 10 minutes; (II) a copolymer of ethylene and ethyl acrylate containing about 10 to about 50 percent by weight of units of ethyl acrylate and having a melt mass flow rate of about 1 to about 100 grams per 10 minutes; and (III) a copolymer of ethylene and butyl acrylate containing about 10 to about 50 percent by weight of units of butyl acrylate and having a melt mass flow rate of about 1 to about 100 grams per 1.0 minutes;
    (b) about 55 to about 200 parts by weight, based upon 100 parts by weight of component (a), of a linear copolymer of ethylene and an alpha-olefin having 3 to 12 carbon atoms, the linear copolymer of ethylene having a melt mass flow rate of about 0.1 to about 30 grams per 10 minutes and a density of 0.870 to 0.944 gram per cubic centimeter;
    (c) about 1 to about 50 parts by weight, based upon 100 parts by weight of component (a), of an organopolysiloxane having the following formula: $R^3_x R^2_y SiO_{(4-a-b)/2}$
    wherein $R^1$ is an aliphatic unsaturated hydrocarbon group; $R^2$ is selected from the group consisting of alkyl, substituted alkyl, aryl, substituted aryl, hydrogen and mixtures thereof, wherein the substituents of the substituted alkyl and substituted aryl are selected from the group consisting of halogen, cyano and mercapto; x is equal to or greater than 0 but less than 1; y is greater than 0.5 but less than 3; x+y is greater than 1 but less than 3; a is greater than 0 but equal to or less than 1; and b is equal to or greater than 0.5 but equal to or less than 3;

(d) about 10 to about 350 parts by weight, based upon 100 parts by weight of component (a), of carbon black, the semiconductive layer being moisture cured.

8. The cable defined in claim 7 wherein component (c) is grafted to component(a).

9. The cable defined in claim 7 wherein component (c) is grafted to component (b).

10. The cable defined in claim 7 wherein component (c) is grafted to component (a) and (b).

11. A moisture cross linked composition comprising the reaction product of water and a blend of (a) one or more copolymers selected from the group consisting of (I) a copolymer of ethylene and vinyl acetate containing about 10 to about 50 percent by weight of units of vinyl acetate and having a melt mass flow rate of about 1 to about 100 grams per 10 minutes; (II) a copolymer of ethylene arid ethyl acrylate containing about 10 to about 50 percent by weight of units of ethyl acrylate and having a melt mass flow rate of about 1 to about 100 grams per 10 minutes; and (III) a copolymer of ethylene and butyl acrylate containing about 10 to about 50 percent by weight of units of butyl acrylate and having a melt mass flow rate of about 1 to about 100 grams per 10 minutes;

(b) about 55 to about 200 parts by weight, based upon 100 parts by weight of component (a), of a linear copolymer of ethylene and an alpha-olefin having 3 to 12 carbon atoms, the linear copolymer of ethylene having a melt mass flow rate of about 0.1 to about 30 grams per 10 minutes and a density of 0.870 to 0.944 gram per cubic centimeter;

(c) about 1 to about 50 parts by weight, based upon 100 parts by weight of component (a), of an organopolysiloxane having the following formula; 

wherein $R^1$ is an aliphatic unsaturated hydrocarbon group; $R^2$ is selected from the group consisting of alkyl, substituted alkyl, aryl, substituted aryl, hydrogen and mixtures thereof, wherein the substituents of the substituted alkyl and substituted aryl are selected from the group consisting of halogen, cyano, and mercapto; x is equal to or greater than 0 but less than 1; y is greater than 0.5 but less than 3; x+y is greater than 1 but less than 3; a is greater than 0 but equal to or less than 1; and b is equal to or greater than 0.5 but equal to or less than 3;

(d) about 10 to about 350 parts by weight, based upon 100 parts by weight of component (a), of carbon black; and (e) from 0 to about 2 parts by weight of an organic peroxide, the reaction of the water and blend providing the moisture cured composition.

12. The composition defined in claim 1 wherein the vinyl acetate in component (a) is present it an amount of about 15 to about 40 percent by weight; the ethyl acrylate of component (a) is present in an amount of about 15 to about 40 percent by weight; and the butyl acrylate in component (a) is present in an amount of about 15 to about 40 percent by weight.

13. The composition defined in claim 1 wherein:

the linear copolymer of ethylene and an alpha-olefin of component (b) is present in an amount of about 75 to about 150 parts by weight;

the organopolysiloxane of component (c) is present in an amount of about 2 to about 10 parts by weight;

the carbon black of component (d) is present in an amount of about 40 to about 300 parts by weight; and the peroxide of component (e) is present in an amount of about 0.15 to about 0.8 parts by weight.

14. The composition defined in claim 11 wherein component (b) is linear low density polyethylene or very low density polyethylene.

15. The composition as defined in claim 11 wherein the organic peroxide has a 10 minute half life at 100 to 200° C.

* * * * *